July 23, 1963   NAOYUKI OHARA   3,098,421
DEPTH OF FIELD VERIFYING DEVICE
Filed March 25, 1960
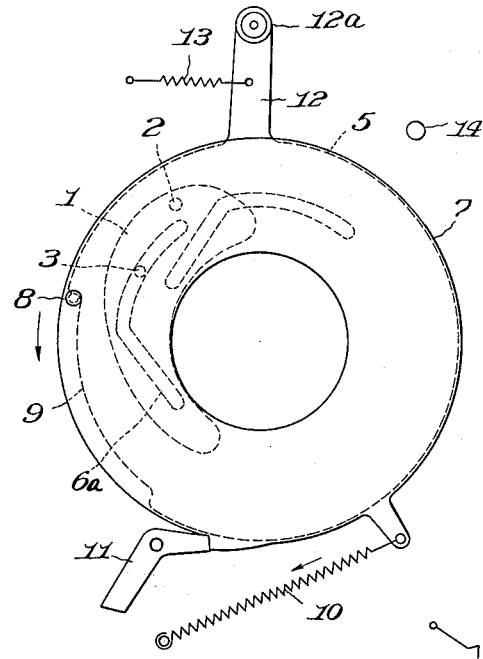
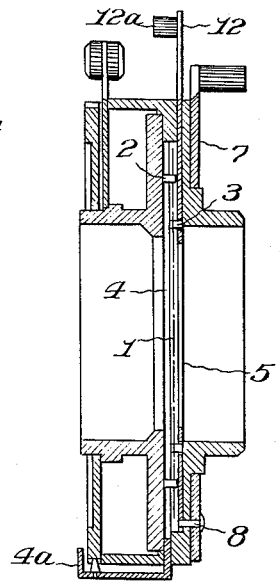
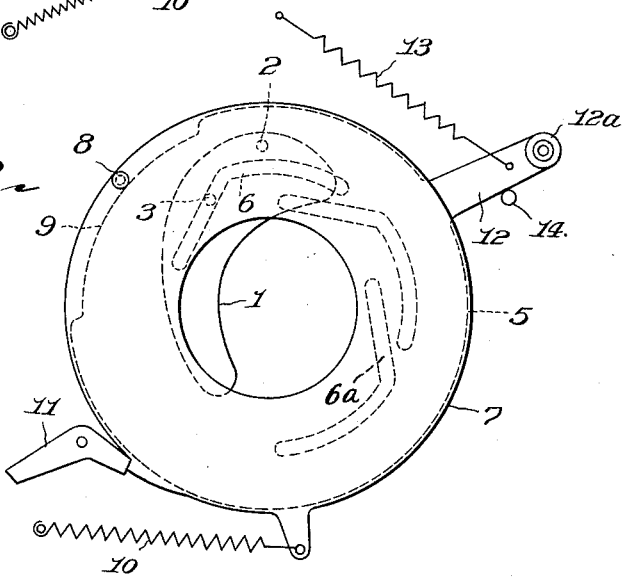

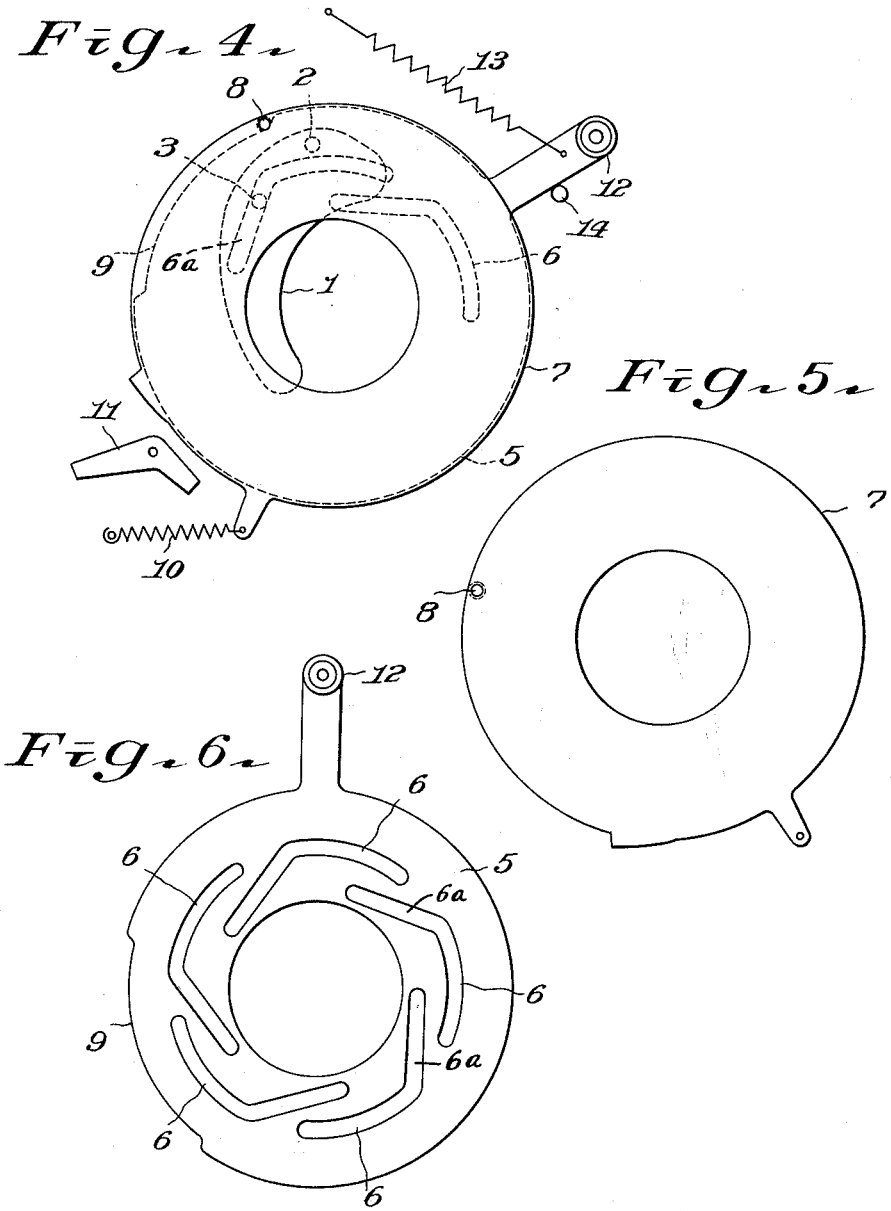

July 23, 1963  NAOYUKI OHARA  3,098,421
DEPTH OF FIELD VERIFYING DEVICE
Filed March 25, 1960  5 Sheets-Sheet 3
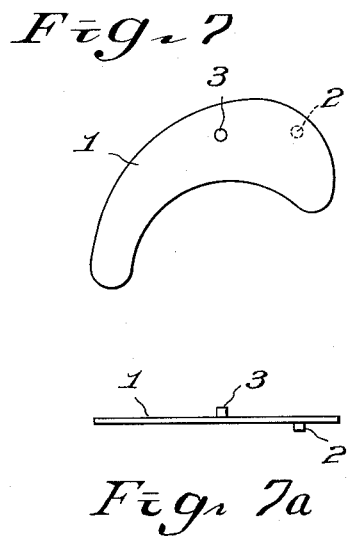
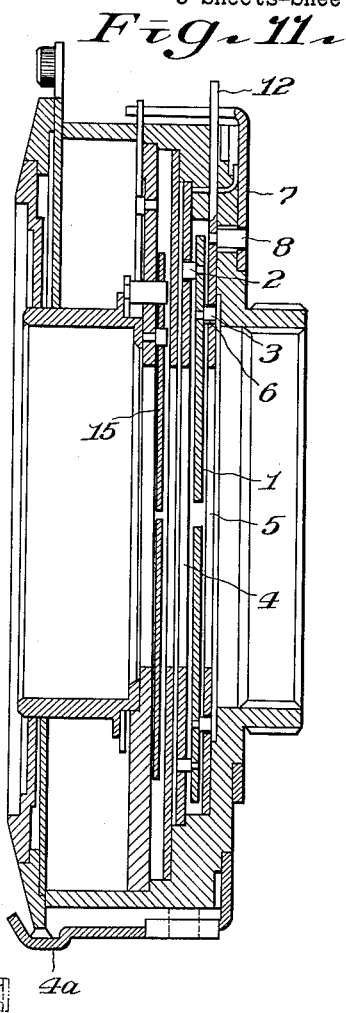
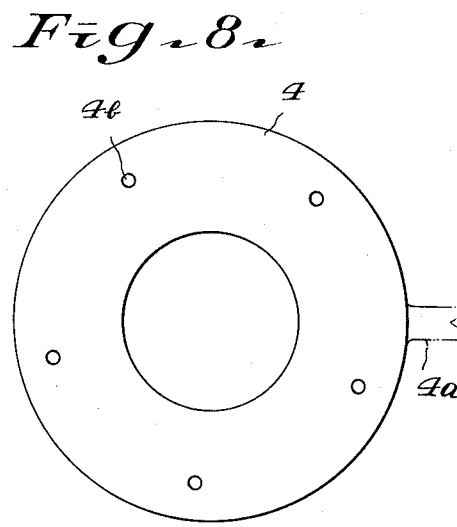

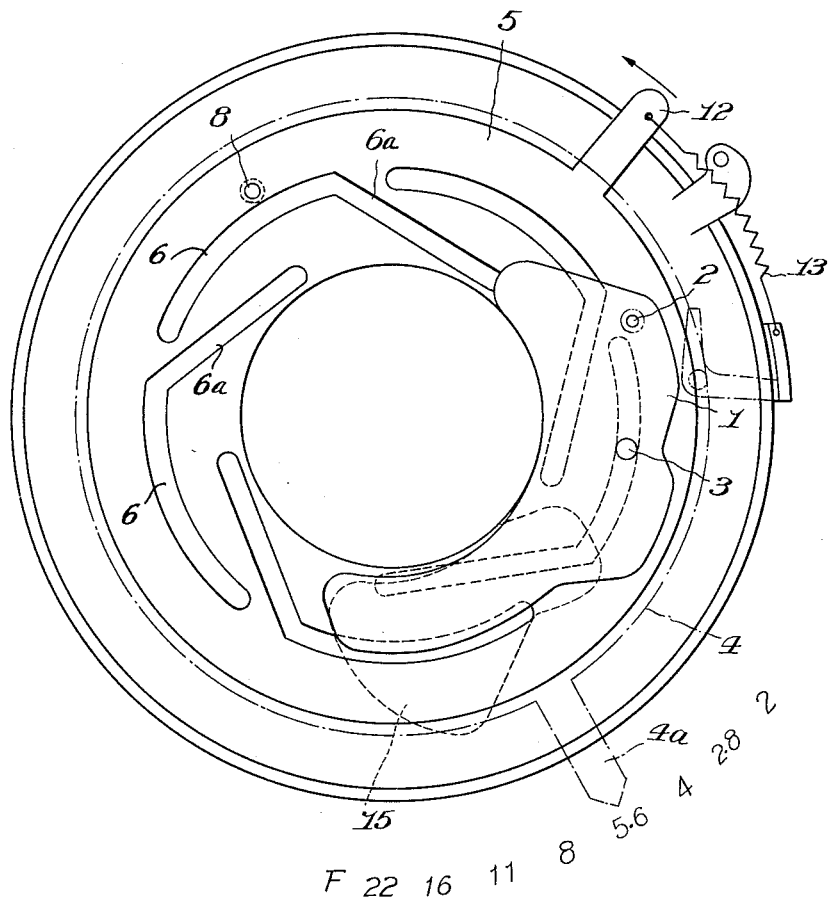

July 23, 1963 NAOYUKI OHARA 3,098,421
DEPTH OF FIELD VERIFYING DEVICE
Filed March 25, 1960 5 Sheets-Sheet 5

United States Patent Office 3,098,421
Patented July 23, 1963

3,098,421
DEPTH OF FIELD VERIFYING DEVICE
Naoyuki Ohara, 436 1-chome, Soshigaya, Setagaya-ku, Tokyo-to, Japan
Filed Mar. 25, 1960, Ser. No. 17,695
Claims priority, application Japan Mar. 30, 1959
2 Claims. (Cl. 95—64)

This invention relates to a shutter and diaphragm device of a photographic camera, and more particularly it relates to a new and improved device for visually verifying the depth of focus, commonly called depth of field, for the lens shutter of a single-lens reflex camera.

Originally, it has been a special advantage of single-lens cameras that, in their use, there is absolutely no parallax between a view finding lens and a lens used for the exposure, and, moreover, it is possible to fully verify, visually, the depth of field at the same diaphragm aperture as that used at the time of photographing. However, particularly in the case of single-lens reflex cameras in which conventional lens shutters are used, the visual observation of the depth of field has been difficult. Consequently the above-mentioned special advantage has been sacrificed or not been fully taken advantage of.

That is, the reason for fully opening the aperture diaphragm, for view finding as practiced heretofore, has been to brighten the focal plane, and it has been considered moreover, that the adjustment of focus by means of the range finder is facilitated because, by the opening of the said diaphragm fully, the depth of field is caused to be shallow. In this case, however, since the said diaphragm is fully opened, it is not possible to view the depth of field at the time of actual photographing or the making the exposure.

It is an object of the present invention, therefore, to provide a new and improved device for a single-lens reflex camera, said device being adapted to enable the visual observation of the depth of field under the diaphragm aperture used in the actual photographing of the subject.

It is a specific object of this invention to provide a new and improved device for a single-lens reflex camera, by means of which the aperture diaphragm in the fully opened condition can be stopped down to a predetermined size of opening for actual photographing, and the visual verification of depth of field is accomplished in an easy and effective manner.

It is another object of this invention to provide a device as above-described which is of simple, yet durable construction and of easy and positive operation.

Said object and other objects of the invention have been achieved by the device of this invention. According to this invention, in a lens shutter for a single-lens reflex camera which comprises two diaphragm operating plates, aperture diaphragm blades each of which has two pivot pins, one of said pivot pins being pivotally engaged in a circular hole of one of said operating plates and the other of said pivot pins being slidably engaged in an obtuse V-shaped slot for the other of said operating plates and a blade opening member; a means for engagement in a single direction between one of the aforesaid operating plates and the said blade opening member is provided, a force is imparted by means of a suitable spring, and rotation through a certain angle is caused as necessary, whereby it is made possible to visually verify the depth of field at the diaphragm aperture size at the time of photographing.

The details of the invention, both as to its construction and its method of operation, together with additional objects and advantages thereof, will be best understood from the following detailed description of representative embodiments of the invention when taken in connection with the accompanying drawings, in which the same or equivalent members are indicated by the same numerals, and in which;

FIG. 1 is an elevational view, as viewed in the direction of the optical axis, of the essential elements of one embodiment of this invention;

FIG. 2 is a side elevational view, for the most part in section, of the embodiment shown in FIG. 1;

FIG. 3 is the same elevational view as the embodiment of FIGS. 1 and 2, but showing the state wherein the depth of field is under verification;

FIG. 4 is an elevational view of the embodiment of FIGS. 1 and 2, for showing the state wherein a blade opening member is released and the diaphragm blades are rotated to a predetermined aperture size;

FIG. 5 is an elevational view of the blade opening member of the embodiment of FIGS. 1 and 2;

FIG. 6 is an elevational view of one of the diaphragm blade operating plate of the embodiment of FIGS. 1 and 2;

FIG. 7 is an elevational view of a diaphragm blade of the embodiment of FIGS. 1 and 2;

FIG. 7a is a side view of the blade shown in FIG. 7;

FIG. 8 is an elevational view of another diaphragm blade operating plate of the embodiment of FIGS. 1 and 2;

FIG. 9 is an elevational view of another embodiment of this invention, for showing the state wherein the blade opening member is cocked;

FIG. 11 is a side view, for the most part in section, of the embodiment of FIG. 9.

Figure 10:
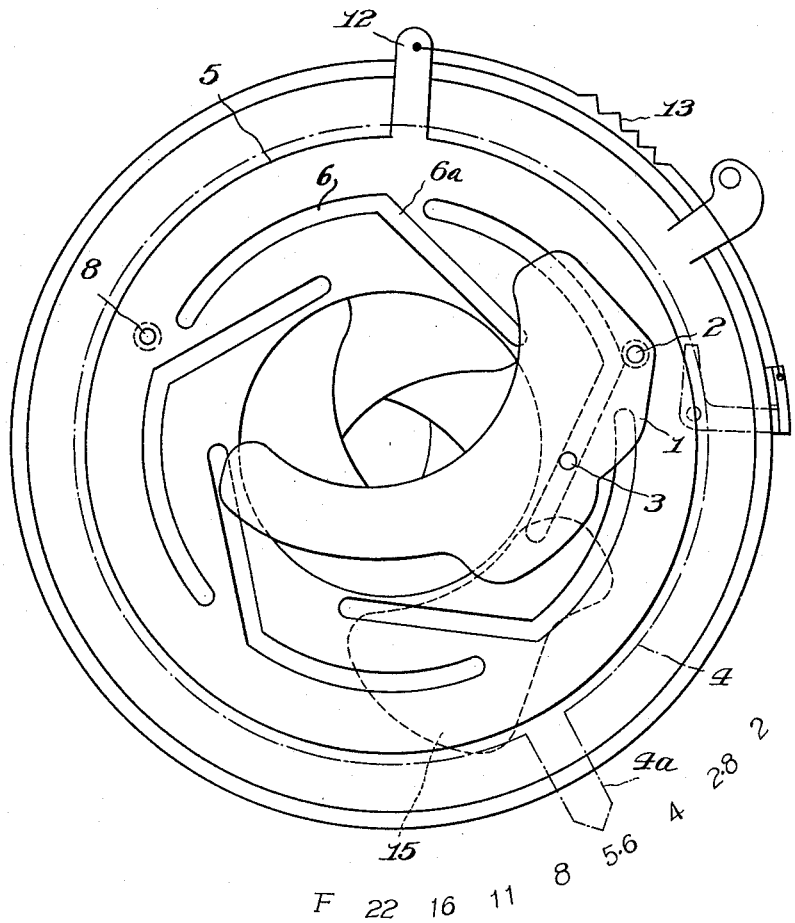
FIG. 10 is an elevational view of the embodiment of FIG. 9, for showing the state wherein one of the diaphragm blade operating plates is somewhat rotated to inspect the depth of field.

Referring to FIGS. 1–8, the embodiment comprises, essentially: an aperture diaphragm composed of several diaphragm blades 1, only one of said blades being shown, and said blade having two pivot pins 2 and 3 thereon; two diaphragm operating plates 4 and 5 disposed coaxially on opposite sides of the diaphragm blades 1 for operating said blades, said operating or diaphragm opening determining plate 4 having an aperture indicator 4a attached thereto and a circle of holes each one of which is engaged pivotally with the aforesaid pin 2 of one of said blades 1, and the other operating plate 5 having a similar number of obtuse V-shaped slots 6, 6a each of which is engaged slidably with the aforesaid pivot pin 3 of one of said blades; a blade opening member 7 which is disposed coaxially with the aforesaid operating plates 4 and 5, on the same side of the diaphragm as said plate 5, said member 7 having a pin 8 fixed thereto, which is engaged with said plate 5 by being in slidable contact with a recessed guide surface 9 on the periphery of said plate 5, and said member 7, moreover, being linked directly or indirectly to the shutter blades which are not shown, because they have no direct relation to the characteristic point of this invention; a spring 10 which imparts a strong, elastic force in the arrow direction to the said opening member 7; a release lever 11 for the said opening member 7; an operating lever 12 and knob 12a attached thereto, said lever being provided on the aforesaid operating plate 5; a spring 13 for imparting a weak, elastic force to the said operating plate 5 in the direction opposite to that of the said opening member 7; and a stop pin 14 for fixing the degree of manipulation of the aforesaid operating lever and knob.

With the arrangement as described above, the various elements will be in the condition shown in FIG. 1 when the shutter is cocked, or in the case of a single-lens reflex camera having a quick-return device, regardless of the sequence before or after the cocking of the shutter.

In the condition prior to the cocking of the shutter of a camera without a quick-return device, the shutter blades are closed, the diaphragm blades 1 are stopped down to a predetermined aperture size with pins 3 lying in portion 6a of V-shaped slots 6, 6a; on the other hand, the mirror and film cover plate are in the raised position, and the film surface is exposed. In the condition after the cocking of the shutter, when the cocking of the set lever and the advance of the film are accomplished simultaneously, first, the film cover plate descends and covers the surface of the film, the mirror successively descends, and the shutter blades (not shown) and the diaphragm blades 1 open fully as shown in FIG. 1 with pins 3 lying in arcuate portion 6 or V-shaped slots 6, 6a. In the case of a camera with a quick-return device, the shutter blades and diaphragm blades 1 open fully, irrespective of the sequence before or after the cocking, and the mirror and film cover plate are, of course, in their lowered positions.

Accordingly, in the condition shown in FIG. 1, the operating plate 5 is engaged with the blade opening member 7 through the contact of the end shoulder of the recessed guide surface 9 of said plate 5 against the pin 8; the diaphragm blades 1 and the shutter blades are fully open and are in the condition wherein release after focus adjustment is possible. In the embodiment of the present invention, however, visual verification of the depth of field with the predetermined aperture size as described below is possible during the operation. FIG. 3 shows the said visual verification condition, wherein when the operating plate 5 has been rotated clockwisely by the operating lever 12 from its position shown in FIG. 1, the diaphragm blades 1 are stopped down to the aperture size predetermined for the time of exposure, and it is possible, accordingly, to visually verify the depth of field at said aperture size.

The blade opening member 7, diaphragm blade operating plates 4 and 5, diaphragm blades 1 and two pivot pins 2 and 3 on the said blade 1 are more clearly shown in FIGS. 5–8. The pivot pins 2 and 3 are, respectively, in engagement with a circular hole 4b of one blade operating plate 4 and with the V-shaped slot 6, 6a of the other blade operating plate 5. Consequently, when the diaphragm blade operating plate 5 is rotated while the other operating plate 4 is fixed each blade 1 is rotated around the pivot pin 2, whereby an aperture of a predetermined size can be obtained. On the other hand, when the operating plate 4 is rotated while the other operating plate 5 is fixed, each blade 1 can rotate together with the operating plate 4 while maintaining the pivot pin 3 in engagement with the slot 6 of the plate 5, whereby an aperture of a predetermined size can be obtained.

In embodying this invention, one of the diaphragm blade operating plates 4 and 5, for example, the plate 4 may be used as the member for determining the aperture size and an aperture indicator 4a attached to said plate 4 as shown in FIG. 2 may be used for indicating the aperture size; and the other diaphragm blade operating plate, for example, the plate 5 may be constructed so as to have the function for opening the diaphragm blades fully to adjust the focus and to rotate, if necessary, the said diaphragm blades to the positions adapted to the actual size predetermined by said indicator 4a to verify the depth of field.

Upon the completion of the visual verification, the various elements are returned to the condition shown in FIG. 1 by the release of the operating lever 12 and knob 12a. Then, when the system is released, the release lever 11 disengages from the blade opening member 7, whereby the member 7 is rotated clockwisely by the strong spring 10 and takes the position as shown in FIG. 4. Consequently, the fixed pin 8, mounted on the said opening member, by pressing against the end shoulder of the recessed guide surface 9 of the operating plate 5, rotates said plate 5 in unison, whereby the diaphragm blades 1 are stopped down to the predetermined aperture size; and, simultaneously, the shutter blades are also closed. Successively, the mirror and film cover plate ascend, whereupon the shutter is released, and the shutter blades perform their opening and closing action.

In the case where a quick return device is installed, the signal signifying the completion of the opening and closing action of the shutter is transmitted from the shutter to the mirror or the film cover plate. Accordingly, the film cover first descends to cover the film surface, followed by the mirror, which also descends, and, finally, the shutter blades and diaphragm blades open fully. The device of the present invention is applicable regardless of whether or not a quick return device exists. In the case where a quick return device is provided, the visual verification of the depth of field is possible both prior to and after the cocking of the shutter. In the case where a quick return device is not provided, it is possible to visually verify the depth of field at the time of cocking the shutter.

In FIGS. 9, 10 and 11 another example of this invention is shown, wherein the same members as the example of FIGS. 1–8, are designated by the same numerals. FIG. 9 shows the state in which the aperture indicator 4a is adjusted to determine a predetermined aperture size, the blade opening member 7 is cocked to open the shutter blade 15 fully, the shutter blade being fully opened, adjustment of focus can be freely carried out. FIG. 10 shows the state wherein the diaphragm blade 1 is temporarily stopped down to a predetermined aperture size by rotating the diaphragm blade operating plate 5. In the FIG. 10, the inspection or verification of the depth of field can be attained by rotating the handle 12 in the clockwise direction. Since a spring 13 is connected to the handle 12, the members are restored to the state of FIG. 9 when the handle 12 is released.

Since it is obvious that many changes and modifications can be made in the above-described details without departing from the nature and spirit of the invention, it is to be understood that the invention is not to be limited to the details described herein except as set forth in the appended claims.

What I claim is:

1. Diaphragm means for a single lens reflex camera, comprising a plurality of diaphragm leaves, which form an aperture of variable diameter, each leaf being provided with a first pin and a second pin, a first diaphragm operating disc mounted coaxially of said single lens provided with a plurality of apertures each to receive said first pin of one of said leaves, a second diaphragm operating disc mounted coaxially of said single lens provided with a plurality of slots each to receive the said second pin of one of said leaves, said slots being of generally V form, one arm of the V being arcuate concentric with said aperture, the other arm of the V being generally straight and parallel to a tangent to said aperture, one of said discs being adapted to rotate in one direction through a fixed angle to open the diaphragm for view finding, and movable through the same fixed angle in the opposite direction to close the diaphragm as required for picture taking, the other said disc being adjustably rotatable to determine the diaphragm opening size when said one of said discs is in the position for picture taking, said second pins of each said leaf lying in the arcuate portion of its corresponding V-shaped slot when one of said discs is rotated to open the diaphragm for view finding and lying in the other arm of said V-shaped slot when rotated to the position for picture taking, the position in said generally straight portion of said V-shaped slot of said second pin being determined by the adjustment of the other of said discs to determine the diaphragm opening size for picture taking.

2. The device of claim 1, in which said first disc is adjustable to determine the diaphragm opening size for picture taking, and the second said disc is movable through a fixed angle to open the diaphragm for view finding, or close the lens to the size determined by the adjustment of said first said disc.

References Cited in the file of this patent
UNITED STATES PATENTS

| | | |
|---|---|---|
| 2,344,382 | Aiken | Mar. 14, 1944 |
| 2,580,324 | Schwarz | Dec. 25, 1951 |
| 2,989,908 | Bolsey | June 27, 1961 |
| 3,009,407 | Brown | Nov. 21, 1961 |